United States Patent
Mueller et al.

(10) Patent No.: US 11,993,067 B2
(45) Date of Patent: May 28, 2024

(54) COMPOSITE SPACER FABRIC

(71) Applicants: Stefan Mueller, Wiehl (DE); Sabine Jenewein, Wiehl (DE)

(72) Inventors: Stefan Mueller, Wiehl (DE); Sabine Jenewein, Wiehl (DE)

(73) Assignee: MUELLER TEXTIL GMBH, Wiehl-Drabenderhoehe (DE)

( * ) Notice: Subject to any disclaimer, the term of this patent is extended or adjusted under 35 U.S.C. 154(b) by 0 days.

(21) Appl. No.: 16/857,286

(22) Filed: Apr. 24, 2020

(65) Prior Publication Data

US 2020/0338853 A1     Oct. 29, 2020

(30) Foreign Application Priority Data

Apr. 26, 2019   (DE) .................. 102019110908.6

(51) Int. Cl.
| | |
|---|---|
| B32B 5/26 | (2006.01) |
| A47C 31/00 | (2006.01) |
| B32B 5/02 | (2006.01) |
| B32B 5/06 | (2006.01) |
| B32B 5/12 | (2006.01) |
| B32B 7/09 | (2019.01) |
| B32B 9/02 | (2006.01) |

(Continued)

(52) U.S. Cl.
CPC .............. *B32B 5/26* (2013.01); *B32B 5/026* (2013.01); *B32B 5/06* (2013.01); *B32B 5/12* (2013.01); *B32B 7/09* (2019.01); *B32B 9/025* (2013.01); *B32B 27/06* (2013.01); *B32B 27/12* (2013.01); *D04B 21/20* (2013.01); *A47C 31/006* (2013.01); *B32B 2262/0253* (2013.01); *B32B 2262/0261* (2013.01); *B32B 2262/0276* (2013.01); *B32B 2451/00* (2013.01); *B32B 2605/003* (2013.01); *B60N 2/58* (2013.01); *D10B 2321/02* (2013.01); *D10B 2331/02* (2013.01); *D10B 2331/04* (2013.01); *D10B 2505/08* (2013.01)

(58) Field of Classification Search
CPC .. B32B 5/26; B32B 5/026; B32B 5/06; B32B 7/09; B32B 9/025; B32B 27/12; A47C 31/006; B60N 2/58
See application file for complete search history.

(56) References Cited

U.S. PATENT DOCUMENTS

| | | | |
|---|---|---|---|
| 8,286,451 B2 | 10/2012 | Mueller | |
| 8,714,626 B2 * | 5/2014 | Kornylo | B60N 2/5891 296/146.7 |

(Continued)

FOREIGN PATENT DOCUMENTS

| | | |
|---|---|---|
| DE | 202015105577 A | 12/2016 |
| EP | 0529671 A | 3/1993 |

*Primary Examiner* — Joanna Pleszczynska
(74) *Attorney, Agent, or Firm* — Andrew Wilford (57) ABSTRACT

A warp-knitted textile composite has a spacer fabric that extends in a production direction and a transverse direction and has an outer flat warp-knitted fabric layer of predetermined stretchability, an inner flat warp-knitted fabric layer of lesser stretchability in the production and transverse directions than the outer layer, and spacer threads interconnecting the warp-knitted fabric layers. A decorative cover layer is attached to the outer flat warp-knitted fabric layer and is formed with compressed areas where the spacer fabric is permanently at least partially compressed for structuring the decorative cover layer.

16 Claims, 4 Drawing Sheets

(51) Int. Cl.
  *B32B 27/06* (2006.01)
  *B32B 27/12* (2006.01)
  *B60N 2/58* (2006.01)
  *D04B 21/20* (2006.01)

(56) References Cited

U.S. PATENT DOCUMENTS

| | | | |
|---|---|---|---|
| 2005/0238842 A1* | 10/2005 | Schindzielorz | D04B 21/16 |
| | | | 428/86 |
| 2013/0057035 A1* | 3/2013 | Nishiura | B60N 2/7011 |
| | | | 297/218.3 |
| 2014/0346820 A1* | 11/2014 | Brandt | B32B 5/022 |
| | | | 297/180.13 |
| 2016/0263857 A1* | 9/2016 | Mueller | D04B 1/102 |
| 2017/0079444 A1* | 3/2017 | Blazar | A47C 31/105 |
| 2018/0187348 A1 | 7/2018 | Mueller | |

* cited by examiner

COMPOSITE SPACER FABRIC

FIELD OF THE INVENTION

The present invention relates to a spacer fabric. More particularly this invention concerns a spacer fabric with several layers.

BACKGROUND OF THE INVENTION

A spacer fabric that extends in a production direction and a transverse direction and has an outer flat warp-knitted fabric layer, an inner flat warp-knitted fabric layer, and spacer threads interconnecting the warp-knitted fabric layers, with a decorative cover layer attached to the outer flat warp-knitted fabric layer.

Such a composite is provided in particular for a seat cover or an interior lining or is designed as a seat cover or interior lining.

The assignment of the production direction and transverse direction is customary for warp-knitted textiles, the production direction also being referred to as the warp-knitting direction or the longitudinal direction. In the spacer fabric, the individual yarns forming the knitted fabric run along the production or warp-knitting direction and, based on this, have a usually recurring knitting pattern, according to which for example the spacer threads run back and forth between the two warp-knitted fabric layers, possibly also with an offset in the transverse direction.

According to the usual definition of terms, the two flat warp-knitted fabric layers have stitch wales running along the production direction and stitch courses running along the transverse direction.

Spacer fabrics are characterized by a light, air-permeable structure and are elastic in the direction of their thickness due to the spacer threads running between the two warp-knitted fabric layers. For this purpose, monofilament yarns are usually provided as spacer threads that due to their structure have a comparatively high restoring effect.

Due to their elastic properties, spacer fabrics can be used as soft, elastic and air-permeable layers in mattresses, upholstered furniture, clothing, or shoes. Spacer fabrics are also used as technical textiles in the automotive sector, for example for climate seats and seat covers, with spacer fabrics allowing a good contour adjustment due to their cushioning properties and very good resilience.

In addition, spacer fabrics in the automotive sector are also particularly suitable for upholstery in other applications, such as in furniture construction. Spacer textiles are used in the automotive sector for interior lining, whereby composite materials with a spacer textile and a laminated textile layer, e.g. leather, synthetic leather, or a decorative film, can be used for lining the headlining, the dashboards, the center consoles, and the inside of the door.

A composite material or a composite having a spacer fabric and a decorative cover layer is usually connected to an underlying either rigid or flexible basic structure. For example, the composite for the interior lining or in furniture construction can be applied to a rigid substructure or also when a seat or a seat surface is formed on a flexible substructure.

Both with a rigid and a flexible substructure, there is the advantage that curves, angles or other three-dimensional shapes can be compensated to a certain extent in front of the spacer fabric, where in many cases excessive deformation and in particular kinking of the decorative cover layer can be prevented. In addition, a particularly pleasant, soft feel results for a user due to the flexibility of the spacer fabric, but the composite returns elastically to a predetermined shape that is maintained due to the elastic restoring forces of the spacer fabric.

Although spacer fabrics are in some cases far superior to other elastic materials in terms of these properties, there is a need to further improve the mechanical properties of the spacer fabric, particularly in the case of products that are of complex or sophisticated design and in the case of particularly long-lasting products.

U.S. Pat. No. 8,286,451 discloses a spacer fabric and a composite formed therefrom having the spacer fabric and a decorative cover layer, the composite providing reduced tear resistance at a plurality of areas for installation over an airbag or an airbag flap.

For this purpose, the two flat warp-knitted fabric layers of the spacer fabric are each formed from a basic yarn system and a further yarn system, a first part of the stitch courses being formed at least by the basic yarn system, a second part of the stitch courses being formed by the second yarn system, and the yarn(s) of the basic yarn system extend(s) in the second part of the stitch courses without forming stitches and the warp-knitted fabric layers on the first part of the stitch courses have a lower tensile strength in the production direction than on the outer part of the stitch courses. By omitting stitches, weak lines running in the transverse direction are formed, with corresponding weak lines one above the other or with a slight offset in the two warp-knitted fabric layers, so that the two warp-knitted fabric layers are designed identically with regards to their functionality. Correspondingly, the two warp-knitted fabric layers also have the same mechanical properties, at least comparable, not only in terms of their tensile strength but also in terms of their flexural strength and stretchability.

A generic composite and a spacer fabric are known from US 2018/0187348 in which the two warp-knitted fabric layers of the spacer fabric differing fundamentally in terms of their structure and mechanical properties. In the composite of the spacer fabric, the different mechanical properties are used in a particularly advantageous manner. While one of the two warp-knitted fabric layers is quite stretchy in the production direction and transverse direction, the opposite cover layer has only an extremely low stretchability in the production (knitting) and transverse directions. The warp-knitted fabric layer with the low stretchability is adjacent the decorative cover layer, so that the stretchable warp-knitted fabric layer is then opposite the decorative cover layer via the spacer threads.

With regard to folding the spacer fabric known from US 2018/0187348 or a composite material formed therewith, the behavior is completely different from that of composite with uniform layer materials. While the neutral axis is usually in the middle of the thickness with a uniform layer material such as a thick plastic film or cut foam with a bend, with the spacer fabric according to US 2018/0187348, the neutral axis is located, when folded, namely where there are no substantial stretches or strains, on the warp-knitted fabric layer having the low stretchability that is immediately below the decorative cover layer. Due to the properties of the spacer fabric and in particular the immediately adjacent warp-knitted fabric layer having low stretch, the decorative cover layer is optimally protected against kinking, constraints, or the like. With a uniform concave or convex bend, the opposite stretchable warp-knitted fabric layer can be lengthened or shortened accordingly, which also contributes to optimal protection of the decorative cover layer.

The composite known from US 2018/0187348 is distinguished by excellent properties when large uniformly curved or arched surfaces are to be provided or padded.

With regard to alternative spatial arrangements, however, the composite is still in need of improvement.

OBJECT OF THE INVENTION

Against this background, the present invention is based on the object of specifying a composite that can also be provided particularly well in three dimensions with a comparatively small-scale structure.

SUMMARY OF THE INVENTION

A warp-knitted textile composite has according to the invention a spacer fabric that extends in a production direction and a transverse direction and has an outer flat warp-knitted fabric layer of predetermined stretchability, an inner flat warp-knitted fabric layer of lesser stretchability in the production and transverse directions than the outer layer, and spacer threads interconnecting the warp-knitted fabric layers. A decorative cover layer attached to the outer flat warp-knitted fabric layer is formed with compressed areas where the spacer fabric is permanently at least partially compressed for structuring the decorative cover layer.

Likewise, also according to US 2018/0187348, a spacer fabric is used whose cover layers have different and, in particular, significantly different stretchability in the production and transverse directions. However, while according to US 2018/0187348, the flat warp-knitted fabric layer having the lower stretchability directly adjoins the decorative cover layer, in the composite according to the invention the outer flat warp-knitted fabric layer that has greater stretchability than the inner warp-knitted fabric layer, faces the decorative cover layer. Surprisingly, due to this exactly opposite arrangement, a particularly good three-dimensional embodiment of the decorative cover layer was achieved by compressing the spacer fabric at the compressed areas.

The spacer fabric is expediently compressed in the compressed areas by a connection between the decorative cover layer and the inner warp-knitted fabric layer. According to a particularly preferred embodiment of the invention, the decorative cover layer can be sewn to the compressed areas with the spacer fabric by incorporating the inner warp-knitted fabric layer. The decorative cover layer is pulled at the seams with at least partial compression of the spacer fabric in the direction of the inner warp-knitted fabric layer, so that a recess is formed there starting from an initially flat structure. The spacer fabric is then not or at least less compressed between adjacent compressed areas, so that there are raised portions with respect to the decorative cover layer compared to the compressed areas.

The composite can thus be provided with a particularly appealing structuring.

The structuring can also help for example to improve the ventilation of an occupant when used on a vehicle seat. Outer of all, a certain air transport along the compressed areas can be achieved through the three-dimensional structure. However, the composite can particularly preferably also be combined with active ventilation of an air-conditioning seat.

By sewing or by other connections, the compressed areas can form a pattern selected from the group of rib patterns, rectangular patterns, diamond patterns, and triangle patterns. Depending on the specific shaping, triangle patterns are also referred to as diamond patterns. The specified patterns are only examples, although of course arches, circles or irregular patterns and angles are also possible. Of course, different patterns can also be combined with one another in regions or can merge into one another.

When sewing, different types of stitch are considered in order to produce particularly high-quality and visually appealing seams. For example, step stitches, chain stitches including double chain stitches, embroidery stitches or the like are suitable. In practice, this is also referred to as quilting in this context, which is also sewing in the sense of the present invention.

If, for example in the case of a rib pattern, adjacent compressed areas and in particular seams do not intersect, the spacing between the adjacent compressed areas or respectively the center of the adjacent compressed areas can typically be between 15 mm and 100 mm, in particular between 20 mm and 70 mm. The seams can be straight and parallel to each other. Alternatively, the ribs can also be bordered or formed by seams that are not exactly straight and for example are wavy or zigzag.

If, on the other hand individual areas are separated by the compressed areas, these areas can typically have a size between 3 $cm^2$ and 100 $cm^2$, in particular between 8 $cm^2$ and 50 $cm^2$. Here, too, the area information relates to the center of each compressed area that can be formed for example by a seam. The specified areas of the individual portions relate in particular to a rectangular pattern, a diamond pattern, or a triangular pattern.

The particularly good shapability of the spacer fabric can be attributed to various aspects. Outer of all, the outer flat warp-knitted fabric layer facing the decorative cover layer can be deformed particularly easily due to the good stretchability thereof. If, therefore, the spacer fabric is compressed there during the generation of the compressed areas, there is practically no force distribution along the plane of the outer warp-knitted fabric layer due to the good stretchability. The decorative cover layer can therefore be pressed in very well on the outer flat warp-knitted fabric layer.

The inner flat warp-knitted fabric layer lying opposite with respect to the spacer fabric of the decorative cover layer has a lower and preferably significantly lower stretchability. The tension exerted on the compressed areas in particular by a seam on the inner warp-knitted fabric layer can be distributed over a larger area due to the low stretchability.

The outer flat warp-knitted fabric layer and also the decorative cover layer thereon run in an arcuate cross-section between two adjacent compressed areas. As a result of the restoring forces at the compressed areas, tension is exerted on the inner warp-knitted fabric layer that acts in the plane of the inner warp-knitted fabric layer. However, since the inner warp-knitted fabric layer is less and in particular significantly less stretchable than the outer warp-knitted fabric layer, these tension can be absorbed. With regard to the composite, the decorative cover layer that runs in an arcuate cross-section between two adjacent compressed areas can thus be held or stretched out.

In particular, thanks to the inner less stretchable warp-knitted fabric layer, the spacer fabric alone is sufficient to keep the elastically supported decorative cover layer in the desired three-dimensional shape. An additional high-tensile layer of fabric or the like is therefore not necessary, which is particularly advantageous in terms of the simplest possible structure and in terms of good breath ability.

According to the invention and in contrast to the prior art according to US 2018/0187348, the outer flat warp-knitted fabric layer facing the decorative cover layer has greater stretchability in the production and transverse directions than the inner warp-knitted fabric layer. The different stretchability can be easily determined if the spacer fabric is angled under tension. It can then be determined by hand which of the two warp-knitted fabric layers is easier to stretch.

The greater stretchability of the outer warp-knitted fabric layer relates to a normal tension at which the material is not destroyed.

Within the scope of the invention, the stretchability or the stretch for the production direction and transverse direction can also be quantified in accordance with DIN EN ISO 13934-1:2013-08. The standard "textiles, tensile properties formed by textile surfaces, part 1" is also used if the stretch properties of the entire spacer fabric are to be determined in accordance with the prior art. On the one hand however, it has to be taken into account that the stretch behavior should be determined for the two flat warp-knitted fabric layers, it not being necessary to determine a maximum tension.

Rather, for a comparison of the two warp-knitted fabric layers within the scope of the invention, the stretch is determined and compared at a predetermined tension of for example 25 N (Newtons). According to the specified standard, strips of the spacer fabric with a width of 50 mm can be formed for this purpose. An initial length can then be determined along the longitudinal direction of these strips, with which a clamping between test jaws of a stretching device is subsequently provided. The spacer threads can then be severed in order to ultimately be able to test the outer flat warp-knitted fabric layer and the inner flat warp-knitted fabric layer separately from one another with regard to their stretch properties.

According to a preferred embodiment of the invention, taking into account the test described for the production direction and the transverse direction, the stretch determined in accordance with DIN EN ISO 13934-1 at a tension of 25N is at least twice as large for the outer flat warp-knitted fabric layer as for the inner flat warp-knitted fabric, so that there is then a ratio of at least 2:1. The ratio can readily be for example 3:1, 5:1, or 7:1. Ratios of 10:1 or larger can also readily be achieved.

It can be provided that the stretch determined according to DIN EN ISO 13934-1 at a tension of 25 N is between 25% and 60%, in particular between 30% and 48%, in the outer flat warp-knitted fabric layer for the production direction and the transverse direction.

On the other hand the stretch determined according to DIN EN ISO 13934-1 with a tension of 25 N for the inner flat warp-knitted fabric layer is only between 1.5% and 10%, in particular between 2% and 7%, for the production direction and the transverse direction.

In the compressed areas, for example at seams, the spacer fabric is at least partially compressed. The spacer fabric is usually compressed to less than 70% and in particular less than 50% of the thickness of the spacer fabric in the uncompressed state. The spacer fabric is particularly preferably completely or almost completely compressed, so that then only the thickness of the two warp-knitted fabric layers with the compressed spacer threads remains therebetween. The spacer fabric is then compressed, that is to say pressed together, for example in the compressed areas, to less than 40% or to less than 20% of the thickness in the uncompressed state.

Even if the spacer fabric and the decorative cover layer are connected to each other at the compressed areas, for example by yarns, that is to say in particular are sewn, an integral connection can also be provided, in particular by means of adhesive, between the decorative cover layer and the outer warp-knitted fabric layer. Such bonding serves for additional fixation and can also facilitate the production process.

As already explained above, the decorative cover layer can preferably be formed from leather or synthetic leather. Depending on the application, other materials such as a decorative film or a textile can also be considered.

The thickness of the spacer fabric is usually between 2 mm and 20 mm, although this information naturally relates to the uncompressed state. The thickness of the spacer fabric also roughly specifies how much the decorative cover layer can be provided with a three-dimensional pattern by compressing the spacer fabric.

It is preferably provided that at least one of the warp-knitted fabric layers has openings formed by a plurality of stitches. Every textile structure is not completely tight, so that there are always certain openings between the individual yarns. The feature that has at least one of the warp-knitted fabric layers each formed by a plurality of stitches does not refer to this customary textile structure but to a special embodiment of the corresponding warp-knitted fabric layer or both warp-knitted fabric layers, so that openings are formed there that are larger than one stitch or the space between two simple stitches.

Corresponding openings are achieved in practice by fileting (i.e. a miss-lapping or net structure), for which purpose typically two guide bars are used that are not fully occupied. Corresponding knitting or net patterns are shown for example in the specialist book Marcus Oliver Weber/Klaus-Peter Weber "Wirkerei and Strickerei, Technologien-Bindungen-Produktionsbeispiele," 6th Edition 2014, deutscher Fachbuchverlag, pages 188 and 189.

Appropriate openings can be used to achieve particularly good air or fluid transport in the thickness direction in particular. Corresponding openings are also known according to US 2018/0187348 for the warp-knitted fabric layer having the greater stretchability.

According to this prior art, this embodiment is also based on the knowledge that, in the case of conventional knitting patterns, an improvement in the stretchability can be achieved solely on the basis of the lattice-like or net-like structure.

Despite this discovery, provided according to a preferred embodiment of the invention both warp-knitted fabric layers each have openings formed by a plurality of stitches. In the inner, less stretchable warp-knitted fabric layer within the scope of the invention, however, a knitting pattern is then to be provided that, despite the formation of corresponding openings, has only a comparatively low stretchability, i.e. the openings do not contribute to a substantial increase in the stretchability.

With regard to the composite according to the invention, the formation of corresponding openings in both warp-knitted fabric layers is advantageous, but not mandatory. For example, the spacer fabric also known from US 2018/0187348 is basically suitable to form the composite according to the invention. In contrast to the composite material known from this prior art, the spacer fabric is then to be oriented exactly oppositely, so that, according to the invention, the warp-knitted fabric layer with the greater stretchability, which is referred to in the scope of the invention as the outer warp-knitted fabric layer, faces the decorative cover layer and preferably directly adjoins the decorative cover layer.

With regard to the spacer fabric, which is known per se, a variant of the composite according to the invention provides that the inner warp-knitted fabric layer is formed from at least a first yarn system with a first knitting pattern and a second yarn system with an second knitting pattern, wherein as the first knitting pattern a modified pillar pattern is provided, in which the yarns of the first yarn system form pillar stitches in an alternating sequence in the knitting direction and are guided without stitch formation, and the yarns of the second yarn system each extend over at least two adjacent stitch wales in the production direction.

With regard to the further embodiment options of such a spacer fabric, reference is expressly made to the disclosure content of US 2018/0187348.

In order to achieve a particularly low stretch regardless of the specific knitting pattern for the inner warp-knitted fabric layer, it is provided according to a preferred development of the invention that the inner warp-knitted layer has multifilament smooth yarn and/or monofilament yarn or is formed therefrom. The corresponding yarns then have only a comparatively low stretch along their longitudinal direction, in particular if they are formed from conventional thermoplastics material such as polyester, polyamide, or polyolefin such as polyethylene or polypropylene.

In order to achieve good stretchability with regard to the outer warp-knitted fabric layer, on the other hand it is preferably provided that the outer warp-knitted fabric layer has or is formed from textured multifilament yarn. When texturing, the multifilament yarns are deformed and angled to a certain extent along their longitudinal direction, so that the yarns are shortened without tensile stress. When a tensile stress is applied, the individual textured multifilament yarns can then be pulled straight again to a certain extent, so that good stretch properties and, to a limited extent, elastic restoring properties along the longitudinal direction of the textured multifilament yarn result with the usual and also preferred use of non-elastic thermoplastics.

Multifilament yarns with a fineness between typically 49 dtex and 190 dtex are suitable for both the outer warp-knitted fabric layer and the inner warp-knitted fabric layer. Multifilament yarns can have for example 24 yarns, but other yarn configurations, including multifilament yarns based on microfibers, can also be considered.

The spacer threads are usually formed from monofilament yarn, and the fineness can be selected in particular as a function of the desired compression hardness.

As already explained above, the composite can be provided both for vehicle seats or interior lining or form a seat cover or interior lining. If for example the composite is provided for a vehicle seat, the inner warp-knitted fabric layer is usually followed by a pressure-elastic substructure, for example a further spacer fabric with a greater thickness. It is known for example that spacer fabrics can be used to achieve fluid distribution in a vehicle seat. A corresponding substructure, for example a further spacer fabric, can then also be used to achieve an air distribution in the surface, in which case this additional spacer fabric is not impaired by the compressed areas and thus air distribution is not impeded. The above-described spacer fabric with the decorative cover layer attached to the outer warp-knitted fabric layer is then substantially intended for air to pass through in the thickness direction, an open structure with openings in both fabric layers being particularly advantageous here.

If the composite is provided for example for a vehicle seat or forms the seat cover or seat surface of a vehicle seat, the pressure-elastic substructure can also have a ventilation device in a particularly advantageous manner or can be connected to a ventilation device.

In principle, however, other areas of a motor vehicle, surfaces of a piece of furniture, seat surfaces of a chair, or the like can also be equipped with the composite according to the invention. In such a case, the inner warp-knitted fabric layer is then connected for example to a substrate, in particular a dimensionally stable substrate.

With regard to the spacer fabric, it is provided according to a preferred embodiment that the easily stretchable outer warp-knitted fabric layer and the less stretchable warp-knitted fabric layer that is referred to here as the inner warp-knitted fabric layer, each have openings formed by a plurality of stitches. In the scope of such an embodiment, the two warp-knitted fabric layers then have corresponding openings that, however, are formed differently. With the inner warp-knitted fabric layer, care must be taken to ensure that the openings do not provide too much stretchability.

In the scope of the invention, the fact that the inner warp-knitted fabric layer has a first yarn system makes a substantial contribution to this, the yarns of the first yarn system running along the production direction at exactly one respective stitch wale, whereby a high tension in the production direction is then achieved by these yarns of the first yarn system. As already described above and also known from US 2018/0187348, the first yarns of the first yarn system in the production direction can alternately form pillar stitches or be guided without stitch formation. For example, for two stitch courses, on the one hand the formation of pillar stitches and on the other hand the threading without stitch formation can be provided. If the yarns are passed without stitch formation, however, they can be guided around the corresponding needles in the knitting process, so that in practice this is also referred to as an one-needle inlay ("Schuss unter 1").

In order to form openings in the inner slightly stretchable warp-knitted fabric layer, the second yarn system can be formed as a filet pattern (i.e. a miss-lapping or net-like structure) having a first partial yarn system and a complementary second partial yarn system. In the scope of the invention, the partial yarn systems typically formed with a respective guide bar are referred to collectively as a second yarn system due to the fact that the knitting pattern is the same but inverted. According to a filet pattern that is conventional per se, it can be provided that the two partial yarn systems are formed with two guide bars, each with a feed 1 full, 1 empty or 2 full, 2 empty. Fundamentally, further knitting patterns are also known that can also be considered within the scope of the invention. Each opening can extend for example over two stitch courses.

And despite the formation of the openings to achieve the least possible stretch in the production and transverse directions, according to a particularly preferred embodiment of the invention on the one hand the yarns of the second yarn system alternately form pillar stitches along the production direction and on the other hand form stitches formed from the group of tricot, cord, satin, velvet, and atlas. The stitches selected from the group of tricot, cord, satin, velvet, and satin connect the individual stitch wales in the transverse direction so that there is little stretchability in the transverse direction. However, if the yarns of the second yarn system, that is to say the first partial yarn system and the complementary second partial yarn system, also form pillar stitches, the tensile strength in the production direction is further increased and the stretchability is also reduced.

Even if the inner warp-knitted fabric layer has openings formed by a plurality of stitches, these openings are expediently smaller than the openings of the outer warp-knitted fabric layer. The yarns of the second yarn system can alternately form n>1 pillar stitches and, on the other hand m>1 stitches selected from the group of tricot, cord, satin, velvet, and atlas along the production direction. In the simplest case, two stitches of the type described are provided in succession in the production direction, but the invention is not restricted to such an embodiment.

In the scope of the invention, the spacer fabric can have for example between 10 and 35, in particular between 18 and 28, stitch courses per centimeter along the production direction.

Along the transverse direction, between 4 and 13, preferably between 6 and 10, stitch wales are usually provided per centimeter.

With a preferred full occupancy of a respective guide bar with spacer threads, the result is a pole stick density per square centimeter between 144 to 728, preferably between 200 and 560. The number of stitch courses and stitch wales is to be determined in accordance with DIN EN 14971.

The weight per unit area can typically be between 200 g/m$^2$ and 750 g/m$^2$, preferably between 350 g/m$^2$ and 600 g/m$^2$.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
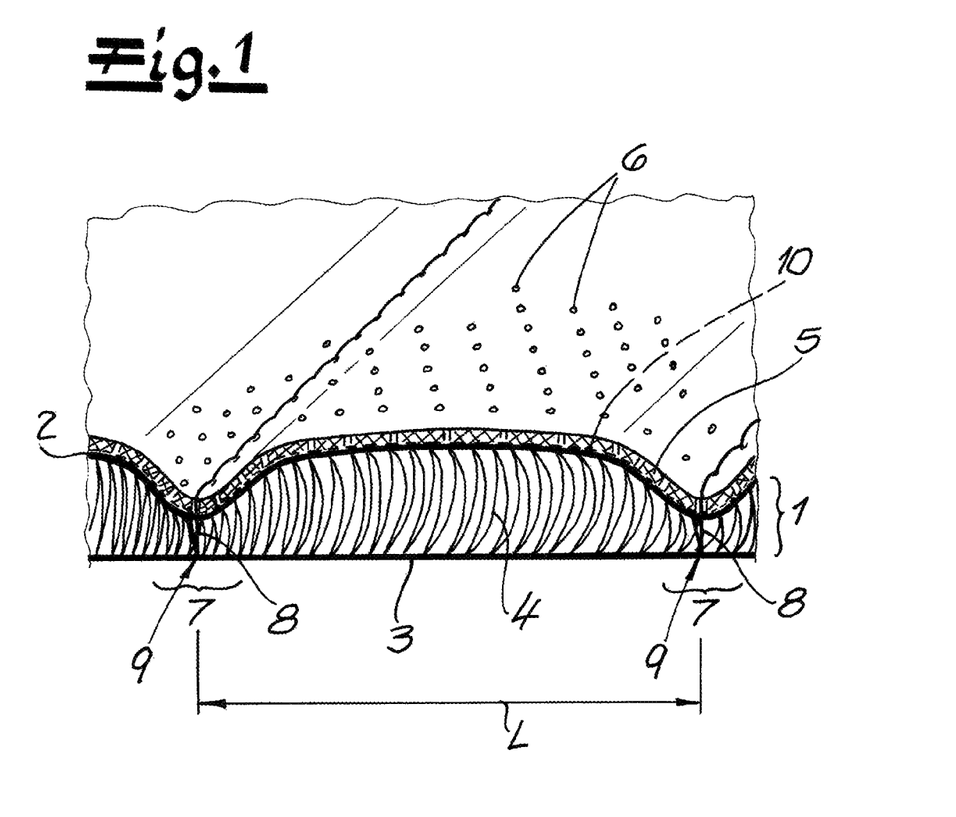
FIG. 1 is a perspective section through a composite according to the invention having a spacer fabric and a decorative cover layer, the spacer fabric and the decorative cover layer being sewn together.

FIG. 1 shows a composite that forms the uppermost layers of a vehicle seat, for example a car seat. The composite comprises a spacer fabric 1 that, as usual, extends along a production direction P and a transverse direction Q perpendicular to it. The embodiment of the spacer fabric 1 is further explained below with reference to the production direction P and the transverse direction Q. The production direction P is also referred to as the knitting direction or the longitudinal direction due to the production method.

The spacer fabric 1 has an outer flat warp-knitted fabric layer 2, an inner flat warp-knitted fabric layer 3 and spacer threads 4 interconnecting the warp-knitted fabric layers 2, 3. In the case of the two flat warp-knitted fabric layers 2, 3, stitch wales extends along in the production direction P and stitch courses in the transverse direction Q. In the warp-knitting process, the stitches of a stitch course are formed at the same time with respective guide bars, the individual yarns running in the production direction P with their respective knitting pattern, that is to say possibly with an offset between the individual stitch wales.

The spacer threads 4 connect the two warp-knitted fabric layers 2, 3 and are responsible for pressure-elastic restoring properties of the spacer fabric 1 when compressed in the direction of the thickness. Monofilament yarn is preferably provided for the spacer threads 4 in order to obtain good elastic properties. The compression hardness can be determined by the yarn material, the density of the spacer threads 4 and their thickness.

According to FIG. 1, a decorative cover layer 5 is provided on the outer warp-knitted fabric layer 2, it being particularly preferably leather or synthetic leather. In principle, however, film materials, textiles, or the like are also conceivable. In the decorative cover layer 5 made of leather or synthetic leather shown in FIG. 1, a perforation 6 is provided in order to allow a ventilation function to be described in more detail below.

In order to achieve a particularly high-quality design of the composite, the spacer fabric 1 has compressed areas 7 where the spacer fabric 1 is permanently at least partially compressed for structuring the decorative cover layer 5. In the compressed areas 7, the decorative cover layer 5 is sewn to the spacer fabric 1 with the incorporation of the inner warp-knitted fabric layer 3, each with a decorative yarn 8, so that connections 9 between the decorative cover layer 5 and the inner warp-knitted fabric layer 3 are formed by the decorative yarns 8.

From FIG. 1, it can also be recognized that the spacer fabric 1 is compressed to less than 50% of its thickness in the uncompressed state in the compressed areas 7.

In the embodiment according to FIG. 1, the compressed areas 7 extend parallel to one another, so that a rib pattern arises. The spacing between adjacent compressed areas 7 with respect to the respective center can typically be between 15 mm and 100 mm.

In the following, further possible patterns of the compressed areas are presented, with the most varied types of patterns and composites also being considered, of course. In particular, a seat surface can be designed by combining different patterns or pattern portions according to the technical requirements and aesthetic requirements.

According to FIG. 1, the spacer fabric 1 is pressed in at the outer warp-knitted fabric layer 2 at the compressed areas 7, while the inner warp-knitted fabric layer 3 lies in one plane. FIG. 1 is idealized in this regard, such asymmetrical behavior is the subject of the invention and also leads to the three-dimensional design of the decorative cover layer 5 being clearly and permanently revealed.

This behavior is achieved in the scope of the invention in that the outer warp-knitted fabric layer 2 facing the decorative cover layer 5 has greater stretchability in the production direction P and in the transverse direction Q than the inner warp-knitted fabric layer 3. If, therefore, the decorative cover layer 5 is pulled at the connections 9 formed by the decorative yarns 8 at the compressed areas 7 in the direction of the inner warp-knitted fabric layer 3, the outer warp-knitted fabric layer 2 can easily deform and in particular stretch there, whereas, due to the higher strength or lower stretchability of the inner warp-knitted fabric layer 3, there is less deformation.

The restoring forces generated by the spacer threads 4 straighten the decorative cover layer 5 between the compressed areas 7, thereby also creating a tensile load on the inner warp-knitted fabric layer 3 in the plane. Due to the low stretchability of the inner warp-knitted fabric layer 3, these tension can be absorbed. Due to the different stretching properties and in particular the low stretchability of the inner warp-knitted fabric layer 3, the decorative cover layer 5 can be "stretched open" to a certain extent by the restoring forces of the entire spacer fabric 1.

It should be taken into account that in the sense of the invention the term stretchability refers to the stretch at a predetermined tension that causes no damage and preferably also no substantial reversible changes in the spacer fabric 1 and in particular in the two warp-knitted fabric layers 2, 3.

The stretchability for the production direction P and the transverse direction Q can be determined for example in accordance with DIN EN ISO 13934-1 at a tension of 25 N. For such a test, strips with a width of 50 mm can be cut from the spacer fabric, the initial length then being marked on the spacer fabric 1, with which the clamping is subsequently provided in a corresponding test device. In order then to be able to test the two flat warp-knitted fabric layers 2, 3 individually, the spacer threads 4 can be cut by an incision made parallel to the warp-knitted fabric layers 2, 3. The influence of the remaining remnants of the spacer threads 4 in the two flat warp-knitted fabric layers 2, 3 is neglected and actually only plays a subordinate role for the stretchability. The patterns thus formed, that is to say strips running in the production direction P or transverse direction Q depending on the test, are then subjected to a tension of 25 N, the increase in length then being determined in percent. Usually, a significantly greater stretch of the outer flat warp-knitted fabric layer 2 compared to the inner flat warp-knitted fabric layer 3 is observed according to the invention. The ratio is at least 2:1, but can readily be 3:1, 5:1, 7:1, or even 10:1 and more.

For example, for the production direction P and the transverse direction Q, the stretch determined in the manner described for a tension of 25 N in the outer flat warp-knitted fabric layer 2 can be between 25% and 60%. Such good stretchability ensures that the outer warp-knitted fabric layer 2 can be easily pressed in at the connections 9. In particular, due to the good stretchability, there is practically no substantial force distribution along the outer warp-knitted fabric layer 2.

The inner flat warp-knitted fabric layer 3 has a significantly lower stretch in the production direction P and transverse direction Q with a tension of 25 N and a test according to DIN EN ISO 13934-1. The stretch can be for example between 1.5% and 10%, in particular between 2% and 7%. This slight stretch ensures that the inner warp-knitted fabric layer 3, as shown in FIG. 1, is only slightly deformed and thus can stretch open the decorative cover layer 5.

Finally, FIG. 1 also shows that the decorative cover layer 5 can be connected to the outer warp-knitted fabric layer 2 by positive substance jointing, in particular by adhesive 10 that also facilitates the production process.

The properties of the spacer fabric 1 described above can also be illustrated in FIG. 2 that shows the composite before and after sewing only in one section.

Figure 2:
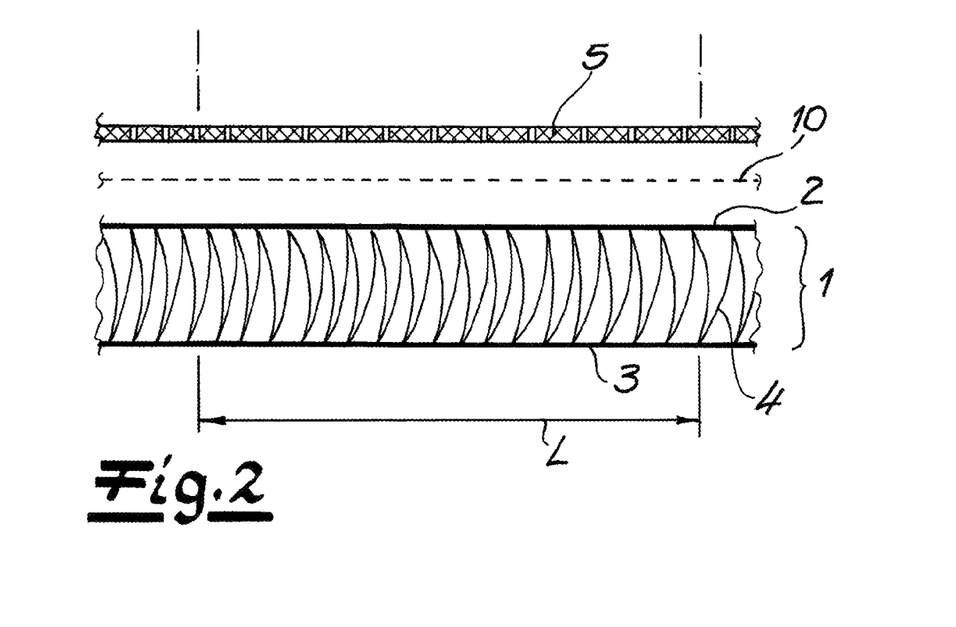
FIG. 2 is a section through the decorative cover layer and the spacer fabric before and after sewing.

Before the corresponding connections 9 are generated by the decorative yarns 8 on the compressed areas 7, the decorative cover layers 5 and the spacer fabric 1 are substantially flat. If the compressed areas 7 are then generated with a spacing L from one another relative to the respective center, this length L is retained at the inner warp-knitted fabric layer 3, while the outer warp-knitted fabric layer 2 can be extended in an arc shape due to its good stretchability.

The measures for generating the different stretch behavior with regard to the outer warp-knitted fabric layer 2 and the inner warp-knitted fabric layer 3 are explained in more detail below.

Figure 3:
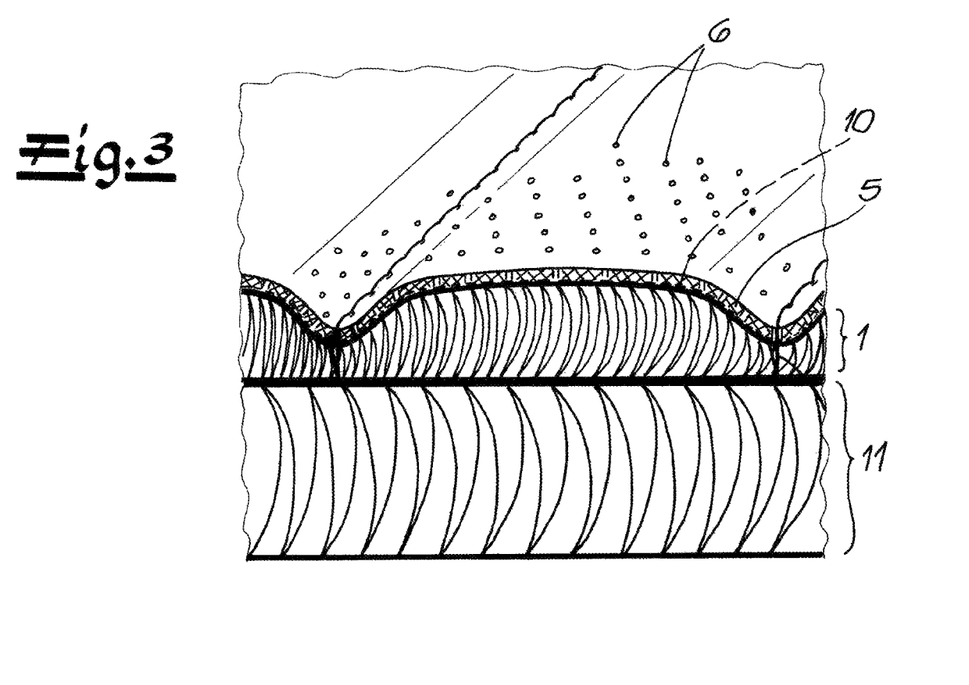
FIG. 3 is a view like FIG. 1 with an additional spacer fabric as an air distribution layer.

FIG. 3 shows a further development of the composite, the decorative cover layer 5 with the spacer fabric 1 being provided on an additional air distribution layer 11. The air distribution layer 11 can also be formed by a further spacer fabric, the air distribution layer 11 being provided for the distribution of cooling air in the plane. For this purpose, the air distribution layer 11 is connected to a ventilation device (not shown), for example a blower.

Air for cooling and air conditioning a user can then be blown out through the spacer fabric 1 and the perforation 6 of the decorative cover layer 5. In this context in particular, the compressed areas 7 can also be particularly advantageous with regard to user comfort, because the blown-in air can be circulated or discharged through the ribs formed in this way. Against this background, very good air permeability in the thickness direction is also advantageous for the spacer fabric 1.

Figure 4:
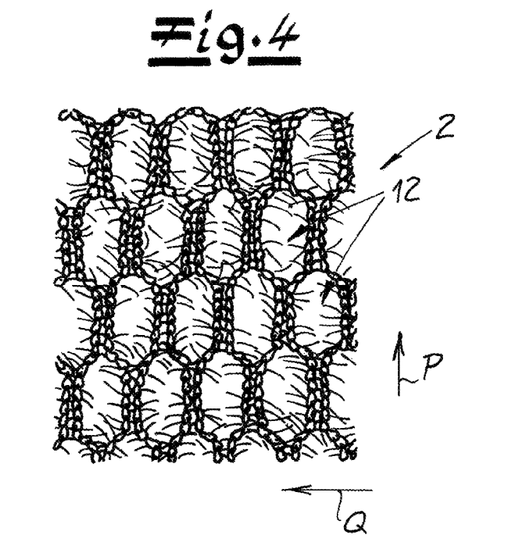
FIG. 4 shows an outer knitted fabric layer of the spacer fabric.

FIG. 4 shows the embodiment of the outer warp-knitted fabric layer 2 by way of example that has good stretchability. The outer warp-knitted fabric layer 2 has a filet pattern (i.e. a miss-lapping or net-like structure), so that the outer warp-knitted fabric layer 2 has openings 12 each formed by a plurality of stitches. The filet pattern is usually formed with two guide bars, wherein the openings 12 also provide good stretchability of the outer warp-knitted fabric layer 2.

In order to further improve these properties, relatively low yarn tension can also be used in the knitting process for the outer warp-knitted fabric layer 2.

Furthermore, the outer warp-knitted fabric layer 2 can also be formed from textured multifilament yarn that is not only particularly soft but also elastically stretchable to a certain extent along its longitudinal direction due to the textured structure. This also applies in particular when the outer warp-knitted fabric layer 2 and preferably the entire spacer fabric 1 is formed from an inelastic thermoplastic polymer such as a polyester, polyamide, or polyolefin.

Figure 5:
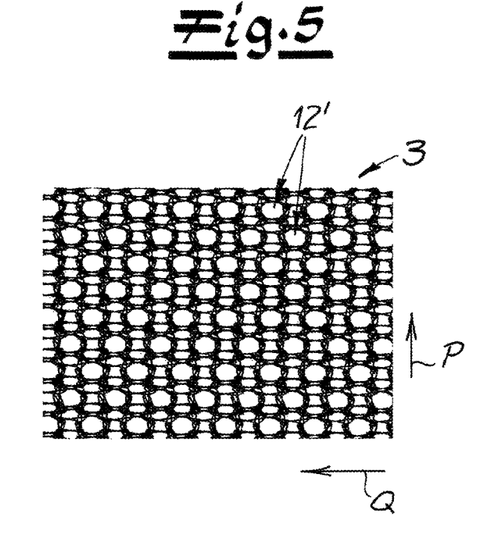
FIG. 5 shows an inner knitted fabric layer of the spacer fabric.

FIG. 5 shows a view of the inner warp-knitted fabric layer 3 that also has openings 12'. Even if FIGS. 4 and 5 are not to scale with respect to one another, it can already be seen from a comparison of the stitch size that the openings 12' of the inner warp-knitted fabric layer 3 in the embodiment are significantly smaller than the openings 12 of the outer warp-knitted fabric layer 2.

FIG. 5 shows that the inner warp-knitted fabric layer 3 has a lattice structure in which the yarns running in the production direction P and in the transverse direction Q result in a lower stretchability than in the outer warp-knitted fabric layer 2. This is particularly due to a special knitting pattern that is provided for the inner warp-knitted fabric layer 3. It is substantial for the low stretch along the production direction P that, according to FIG. 6, the inner warp-knitted fabric layer 3 has a first yarn system 13 with a first knitting pattern in the form of a modified pillar pattern. According to FIG. 6, it is provided for the yarns of the first yarn system 13 that they form pillar stitches 14 in an alternating sequence in the production direction P and are guided without stitch formation. According to FIG. 6, two pillar stitches 14 are always formed along the production direction P and then two stitches are omitted, but the individual yarns are displaced around the respective needles along a stitch wale.

Figure 6:
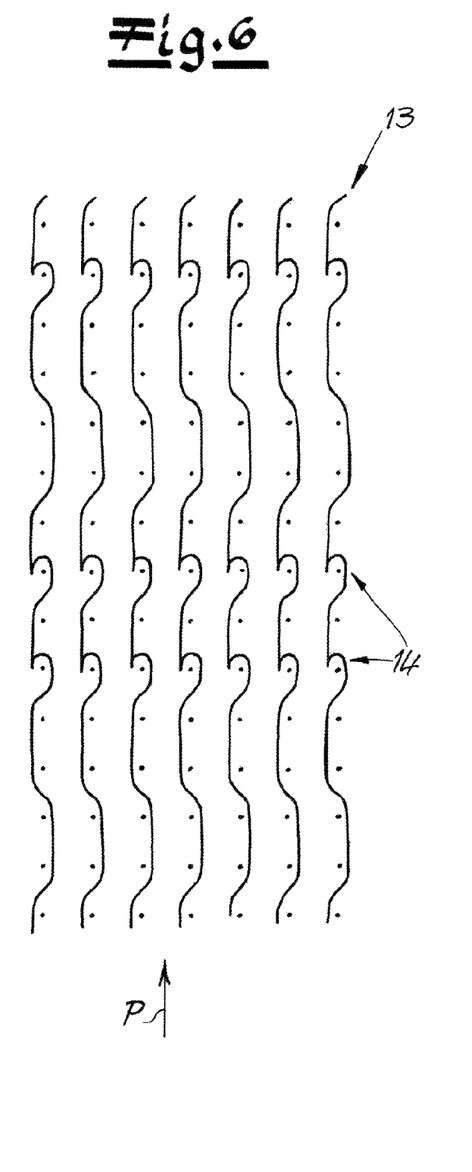
FIG. 6 shows the knitting pattern for a second yarn system of the inner knitted fabric layer.

To form the inner warp-knitted fabric layer 3, a second yarn system 15 with a first partial yarn system 15a and a complementary second partial yarn system 15b is further provided. Since the two partial yarn systems 15*a*, 15*b* per se have a matching but complementary knitting pattern and together form the filet pattern, in the scope of the invention these are collectively referred to as the second yarn system 15, even if for each partial yarn system 15*a*, 15*b* in the knitting process a guide bar is provided. The two partial yarn systems 15*a*, 15*b* can be formed for example with two guide bars, each with a feed 1 full, 1 empty.

Figure 7:
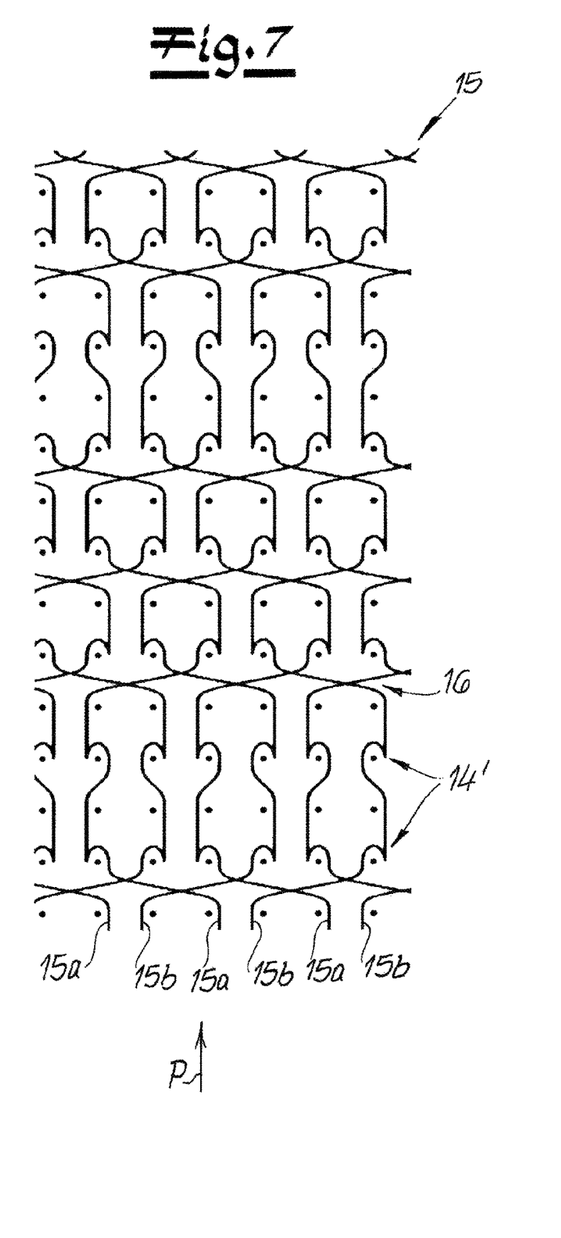
FIG. 7 shows the knitting pattern of a first yarn system of the inner knitted fabric layer having an outer partial yarn system and an inner partial yarn system.

According to FIG. 7, the yarns of the second yarn system 15 alternately form pillar stitches 14' and stitches of a cord pattern 16 along the production direction P. Specifically, two pillar stitches 14' alternate with two stitches of a cord pattern 16. A small stretch along the transverse direction Q is achieved through the stitches of a cord pattern 16.

The sequence of two pillar stitches 14' and two stitches 16 of a cord pattern is only by way of example, it also being possible to provide a larger number with regard to the two stitch types. The cord pattern is also only shown by way of example. In addition, stitches selected from the group of tricot, satin, velvet, and atlas can also be considered.

In order to achieve the lowest possible overall stretch, the inner warp-knitted fabric layer 3 with the first yarn system 13 and the second yarn system 15 is made entirely of multifilament smooth yarn.

The thickness of the spacer fabric 1 is typically between 2 mm and 20 mm, in particular between 3 mm and 15 mm.

Figure 8A:
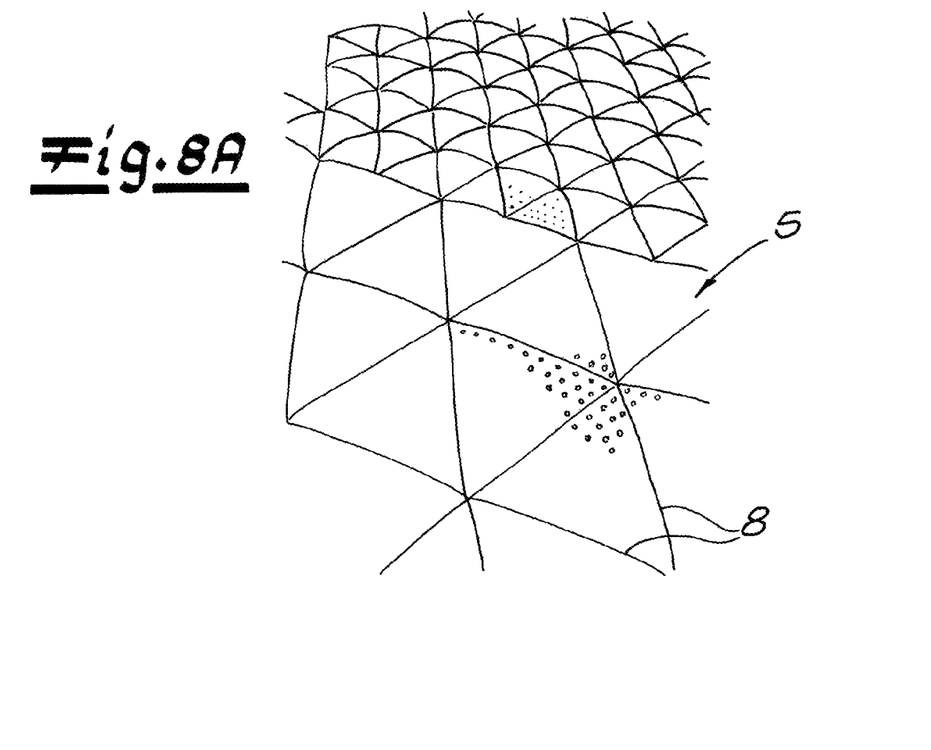
FIGS. 8A and 8B are views like FIG. 1 showing alternative embodiments of the composite.
Figure 8B:
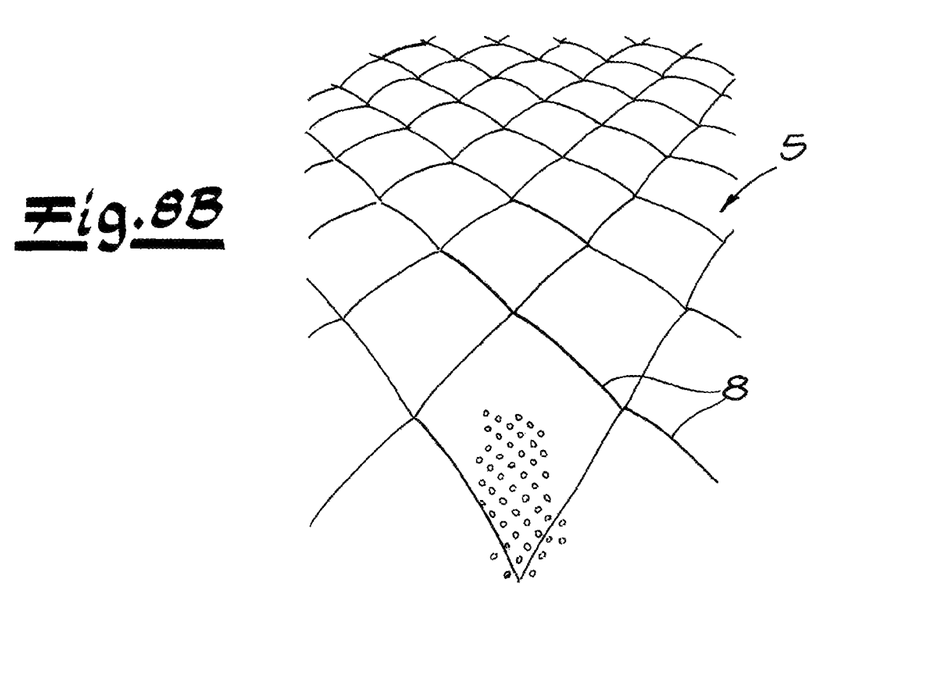

Whereas, according to FIG. 1, a rib structure of the compressed areas 7 is shown by way of example, FIGS. 8A and 8B show further possible embodiments, according to which a triangular pattern is shown there according to FIG. 8A, which is also referred to as a diamond pattern. It has also already been shown that different geometries or at least portions of different sizes can be formed by the compressed areas 7.

According to FIG. 8B, a diamond pattern is provided.

In contrast to FIG. 1, self-contained surfaces are formed on the compressed areas 7 by the decorative yarns 8 according to FIGS. 8A and 8B. The base areas each extending within the decorative yarns 8 can for example have an area between 3 cm$^2$ and 100 cm$^2$.

According to FIG. 3 it is shown by way of example that the decorative cover layer 5 and the spacer fabric 1 are provided on an air distribution layer 11 that forms a pressure-elastic substructure. As an alternative, however, a dimensionally stable substrate can also be connected to the inner warp-knitted fabric layer 3, in order to form for example a dashboard, a side panel, or another type of interior lining of a motor vehicle. Corresponding configurations are of course also conceivable in other areas in which a high-quality appearance or an appealing embodiment are desired.

We claim:

1. A warp-knitted textile composite comprising:
   a spacer fabric that extends in a production direction and a transverse direction and has
   an outer flat warp-knitted fabric layer of stretchability determined in accordance with DIN EN ISO 13934-1 at a tension of 25 N and between 25% and 60% in the production direction and the transverse direction,
   an inner flat warp-knitted fabric layer of lesser stretchability in the production and transverse directions than the outer layer, stretchability being determined in accordance with DIN EN ISO 13934-1 at a tension of 25N and being at least three times as large for the outer flat warp-knitted fabric layer as for the inner flat warp-knitted fabric layer for the production direction and the transverse direction, one of the warp-knitted fabric layers having openings each formed by a plurality of stitches, and
   spacer threads interconnecting the warp-knitted fabric layers, and
   a decorative cover layer attached to the outer flat warp-knitted fabric layer at spaced-apart compressed areas where the spacer fabric is permanently at least partially compressed for structuring the outer layer with a decorative pattern, a spacing between adjacent compressed areas being between 15 mm and 100 mm and/or individual areas separated by the compressed areas having an area between 3 cm$^2$ and 100 cm$^2$.

2. The composite according to claim 1, wherein stretchability determined according to DIN EN ISO 13934-1 at a tension of 25 N in the inner flat warp-knitted fabric layer is between 1.5% and 10% for the production direction and the transverse direction.

3. The composite according to claim 1, further comprising:
   connections between the decorative cover layer and the inner warp-knitted fabric layer that form the compressed areas.

4. The composite according to claim 3, wherein the decorative cover layer is sewn at the compressed areas to the spacer fabric with incorporation of the inner warp-knitted fabric layer.

5. The composite according to claim 1, wherein the spacer fabric in the compressed areas is compressed to less than 50% of the thickness of the spacer fabric in an uncompressed state.

6. The composite according to claim 1, wherein the decorative cover layer is leather, synthetic leather, or textile.

7. The composite according to claim 1, wherein a thickness of the spacer fabric is between 2 mm and 20 mm.

8. The composite according to claim 1, wherein the inner warp-knitted fabric layer is formed from
   a first yarn system having a first knitting pattern and
   a second yarn system having a second knitting pattern, the first knitting pattern having a modified pillar pattern in which the yarns of the second yarn system form pillar stitches in an alternating sequence in the production direction and are guided without stitch formation, the yarns of the second yarn system each extending over at least two adjacent stitch wales in the production direction.

9. The composite according to claim 8, wherein the second yarn system is formed as a filet pattern having a first partial yarn system and a complementary second partial yarn system.

10. The composite according to claim 9, wherein the two partial yarn systems are formed with two guide bars, each with a feed 1 full, 1 empty or a feed 2 full, 2 empty.

11. The composite according to claim 9, wherein the yarns of the second yarn system alternately form pillar stitches along the production direction and form stitches selected from the group of tricot, cord, satin, velvet, and atlas.

12. The composite according to claim 1, wherein the inner warp-knitted fabric layer comprises multifilament smooth yarns and/or monofilament yarns.

13. The composite according to claim 1, wherein the outer warp-knitted fabric layer has textured multifilament yarn.

14. The composite according to claim 1, further comprising:
   a pressure-elastic substructure on the inner warp-knitted fabric layer.

15. The composite according to claim 1, further comprising:
  a substrate carrying the inner warp-knitted fabric layer.

16. A warp-knitted textile composite comprising:
  a spacer fabric that extends in a production direction and a transverse direction and has
    an outer flat warp-knitted fabric layer of stretchability determined in accordance with DIN EN ISO 13934-1 at a tension of 25 N and between 25% and 60% in the production direction and the transverse direction,
    an inner flat warp-knitted fabric layer of lesser stretchability in the production and transverse directions than the outer layer, stretchability being determined in accordance with DIN EN ISO 13934-1 at a tension of 25N and being at least three times as large for the outer flat warp-knitted fabric layer as for the inner flat warp-knitted fabric layer for the production direction and the transverse direction, one of the warp-knitted fabric layers having openings each formed by a plurality of stitches, stretchability determined according to DIN EN ISO 13934-1 at a tension of 25 N in the inner flat warp-knitted fabric layer being between 1.5% and 10% for the production direction and the transverse direction, and
  spacer threads interconnecting the warp-knitted fabric layers, and
  a decorative cover layer attached to the outer flat warp-knitted fabric layer at spaced-apart compressed areas where the spacer fabric is permanently at least partially compressed for structuring the outer layer with a decorative pattern, a spacing between adjacent compressed areas being between 15 mm and 100 mm and/or individual areas separated by the compressed areas having an area between 3 cm$^2$ and 100 cm$^2$.

* * * * *